3,390,111
VINYL HALIDE RESINS STABILIZED WITH MIXTURES COMPRISING POLYOLS, PHENOLS AND BARIUM, CADMIUM AND ZINC SALTS

James P. Scullin, Pompton Lakes, and Arthur F. Fletcher, Elizabeth, N.J., assignors, by mesne assignments, to Tenneco Chemicals, Inc., a corporation of Delaware
No Drawing. Filed July 3, 1963, Ser. No. 292,711
20 Claims. (Cl. 260—23)

This invention relates to stabilizers for halogen-containing resins and to the resinous compositions stabilized therewith.

A rapidly expanding industry utilizing vinyl halide resins has created a need for stabilizers that will render the finished articles of manufacture more useful, more versatile in application, and more nearly permanent. During their fabrication into plastic sheets, rigid bodies, and the like, for example, vinyl halide resins are ordinarily subjected to elevated temperatures. The resins so treated tend to decompose somewhat as is evidenced by their development of color. This decomposition is especially pronounced when scrap portions of the resins are reprocessed in apparatus operated at elevated temperatures. Even though the decomposition on heating may not detract to any appreciable extent from the physical properties of the resins, the discoloration seriously restricts their use in many applications. There has therefore arisen a need for stabilized vinyl halide resin compositions that can withstand without darkening or otherwise deteriorating the heating to which they may be subjected during processing as well as the subsequent prolonged heating of the finished products.

In addition to having good heat stability, it is necessary that vinyl halide resins show little or no tendency to plate-out during processing. Plate-out is the result of the separation of one or more ingredients, usually pigments and stabilizers, from a vinyl halide resin composition during the various stages of its processing and the deposition of these materials onto the metal surfaces of the processing equipment. These deposits on the metal surfaces of the processing equipment may cause streaking or spotting of the finished products. They may also interfere with sheet transfer from roll to roll or with the removal of the product from the mold thereby reducing the rate of production. To be useful commercially, the compositions should also have good color, clarity, and light stability.

A number of compounds and combinations of compounds have been suggested for use as stabilizers in vinyl halide resins. While some of these impart heat stability to the resins and others reduce their tendency to plate-out, none have previously been disclosed that will impart to the resinous composition the desired combination of heat and light stability, clarity, resistance to plate-out, and other valuable properties.

It is therefore an object of the present invention to provide stabilizers that when added to a vinyl halide resin will protect the resin from thermal degradation for a prolonged period of time.

It is a further object to provide vinyl halide resin compositions that are stabilized against the deteriorative effects of heat and light.

It is still another object of the invention to provide stabilized halogen-containing resins of unusual clarity that have little tendency to plate-out.

Other objects and advantages of the present invention will be apparent from the detailed disclosure that follows.

In accordance with the present invention, it has been found that vinyl halide resin compositions that have excellent heat and light stability color, clarity, resistance to plate-out, and other valuable properties are obtained by incorporating in the compositions a stabilizer that comprises (a) a mixture of barium, cadmium, and zinc salts that includes at least one salt having an aromatic anion and at least one salt having an aliphatic anion, (b) a phenolic compound, and (c) a polyhydric alcohol that is pentaerythritol, sorbitol, mannitol, methyl glucoside, a polymeric polyhydric alcohol, or a mixture thereof.

In order to obtain stabilized resin compositions having the desired heat and light stability, color, clarity, and resistance to plate-out, it is necessary that the stabilizer contain at least one barium salt and at least one cadmium salt and that a salt of one of these metals have an aromatic anion and a salt of the other metal have an aliphatic anion. It is generally preferred that the stabilizer contain a cadmium salt having an aromatic anion and a barium salt having an aliphatic anion. If desired, other salts of these metals may also be present. The zinc salt that is used in the stabilizer may have either an aliphatic anion or an aromatic anion.

The aliphatic compounds from which the metal salts may be derived are saturated and unsaturated monocarboxylic acids having from 2 to 22 carbon atoms. Particularly advantageous results have been obtained using salts prepared from fatty acids containing from 6 to 18 carbon atoms, for example, caproic acid, caprylic acid, 2-ethylhexanoic acid, pelargonic acid, capric acid, lauric acid, myristic acid, palmitic acid, stearic acid, oleic acid, and linoleic acid, or from naturally occurring mixtures of these acids, such as tallow fatty acids, coconut oil fatty acids, tall oil fatty acid, soybean oil fatty acids, and cottonseed oil fatty acids.

The aromatic compounds from which the metal salts may be derived include aromatic monocarboxylic acids and alkylene bis phenols. Suitable aromatic monocarboxylic acids are benzoic acid and substituted benzoic acids in which the substituents are halogen atoms or alkyl groups containing not more than 8 carbon atoms. Illustrative of these substituted benzoic acids are toluic acids, xylic acids, ethylbenzoic acids, isopropylbenzoic acids, p-tert. butylbenzoic acid, di-tert. butylbenzoic acid, octylbenzoic acid, chlorobenzoic acids, and bromobenzoic acids. The alkylene bis phenols that may be used in the preparation of the salts include, for example, 2,2-bis (4-hydroxyphenyl) propane, 2,2'-methylene bis (4,6-dimethylphenol), 4,4'-methylene bis (2-methyl-6-tert. butylphenol), 2,2-butylidene bis (4,6-dimethylphenol), and 4,4'-butylidene bis (3-methyl-6-tert. butylphenol).

The phenolic compounds that can be used in the stabilizer mixtures include a wide variety of monohydric and polyhydric phenols. The monohydric phenols are substitute phenolic compounds in which the substituents are halogen atoms, alkyl groups, aryl groups, nitro groups, amino groups, carboxyl groups, carbalkoxy groups, and the like. A preferred group of monohydric phenols are alkylphenols having the formula

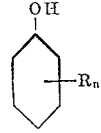

wherein R represents an alkyl group having from 1 to 8 carbon atoms and $n$ represents a number in the range of 1 to 3. Illustrative of these monohydric phenols are the following: cresols, xylenols, carvacrol, thymol, butylphenols, octylphenols, chlorophenols, bromophenols, butylcresols, p-hydroxybenzoic acid and its lower alkyl esters, salicylic acid and its lower alkyl and aryl esters, and alkylphenylphenols.

The polyhydric phenols include both polynuclear phenols and those phenols that have two or more hydroxyl groups attached to a single aromatic nucleus. A preferred group of polyhydric phenols are polynuclear phenols that have the formula

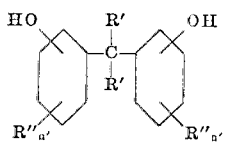

wherein each R' represents a hydrogen atom or a lower alkyl group, R'' represents a lower alkyl group or a halogen atom, and $n'$ represents a number in the range of 0 to 3. Illustrative of the useful polyhydric phenols are the following: resorcinol, alkylresorcinols, catechol, hydroquinone, orcinol, hydroxyhydroquinone, hexahydrobenzene, 2,2-bis (4-hydroxyphenyl) propane, 2,2-bis (4-hydroxydichlorophenyl) propane, 2,2-bis (4-hydroxyphenyl) butane, 4,4'-dihydroxybenzophenone, 4,4'-dihydroxybiphenyl, 1,5 - dihydroxynaphthalene, 2,2'-methylene bis (4-methyl-6-tert. butylphenol), 4,4'-methylene bis (2,6-di-tert. butylphenol), 4,4'-butylidene bis (3-methyl-6-tert. butylphenol), 4,4'-thiobis (3-methyl-6 - tert. butylphenol), 2,2' - dihydroxy - 3,3',5,5'-tetramethylstilbene, methylene bis ($\beta$-naphthol), methylene bis (salicylic acid), 2,2'-isopropylidene bis (4-methyl-6-tert. butylphenol), N-salicoyl-p-aminophenol, and the like. A single phenol or a mixture of two or more of the phenols may be used in the stabilized compositions.

The polyhydric alcohols that can be used in the practice of this invention include pentaerythritol, sorbitol, mannitol, and methyl glucoside. Also useful are the polymeric alcohols that have the formula

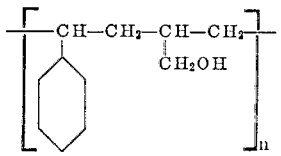

wherein $n$ represents a number in the range of 5 to 10. One such polymeric alcohol, which has a molecular weight of approximately 1150, is marketed as Resinous Polyol X–450. Since their use results in resinous compositions having the best heat stability and clarity, pentaerythritol and sorbitol are the preferred polyhydric alcohols for use in the stabilizers of the present invention. The use of other polyhydric alcohols, such as trimethylolethane, trimethylolpropane, and dipentaerythritol, in the stabilizers results in compositions that do not have the required heat stability and clarity.

The stabilizer compositions of the present invention in most cases contain approximately 25 parts to 45 parts by weight of the barium salt, 10 parts to 30 parts by weight of the cadmium salt, 5 parts to 30 parts by weight of the zinc salt, 5 parts to 20 parts by weight of the phenolic compound, and 5 parts to 20 parts by weight of the polyhydric alcohol with the amount of each largely dependent upon the properties desired in the stabilized resin.

In addition to the aforementioned stabilizers, the stabilized vinyl halide compositions may also contain other heat and light stabilizers, including, for example, organic phosphites and epoxidized oils. The useful phosphites include trialkyl phosphites, triaryl phosphite, and alkyl aryl phosphites. Illustrative of these phosphites are triphenyl phosphite, tri-(p-tert. butylphenyl) phosphite, diphenyl monooctyl phosphite, monophenyl di-2-ethylhexyl phosphite, di-p-tert. octylphenyl monohexyl phosphite, and tridecyl phosphite. The preferred epoxidized oils are epoxidized soybean oil and epoxidized tall oil fatty acids esters.

Only a small amount of the stabilizer need be present in the vinyl halide resin compositions of the present invention. It has been found that as little as 0.1% of the stabilizer, based on the weight of the composition, will bring about an appreciable improvement in the heat and light stability of the composition. Approximately 10% or more of the stabilizer can be used, but these larger amounts generally do not provide further improvement in the properties of the resinous composition and for this reason are not ordinarily used. While the amount of the stabilizer that will provide optimum heat and light stability depends upon such factors as the choice of stabilizer components and the choice of vinyl halide resin, in most cases approximately 0.3% to 5% of the stabilizer, based on the weight of the vinyl halide resin composition, is used.

The vinyl halide polymers that may be employed in the compositions of this invention are the resinous products obtained by the polymerization of a vinyl halide in the presence or the absence of a copolymerizable monomer. The term "vinyl halide resin" as used herein includes vinyl halide homopolymers, such as polyvinyl chloride, polyvinyl bromide, and polyvinylidene chloride, as well as copolymers, such as those formed by the polymerization of a vinyl halide with a comonomer, such as vinyl acetate, vinyl propionate, vinyl butyrate, vinylidene chloride, styrene, methyl methacrylate, dialkyl fumarate or maleate, and the like. The vinyl halide is ordinarily and preferably the chloride, but the bromide and fluoride may also be used. The copolymers useful in the practice of this invention are those prepared from at least 70% of vinyl halide and up to 30% of the comonomer. The invention is also applicable to mixtures of polyvinyl chloride in a major proportion with a minor proportion of such other synthetic resins as chlorinated polyethylene, polyacrylate and polymethacrylate esters, and copolymers of acrylonitrile, butadiene, and styrene.

The present invention is applicable to rigid vinyl halide compositions, that is, compositions that are formulated to withstand temperatures of at least 350° F. as well as to plasticized vinyl halide compositions of conventional formulation, which do not have high softening points. The latter compositions may contain any of the well-known plasticizers for vinyl halide resins, for example, dioctyl phthalate, dibutyl sebacate, tricresyl phosphate, and octyl diphenyl phosphate.

In addition to the aforementioned ingredients, the stabilized resinous compositions may contain other resin additives, such as pigments, extenders, solvents, and dyes in the amounts ordinarily employed for the purposes indicated.

The stabilized vinyl halide resin compositions may be prepared by any convenient procedure. It is generally preferred to blend the stabilizer with the vinyl halide resin using plastic mixing rolls at a temperature at which the mix is fluid and to mill the composition on a two roll mill at from 300° F. to 400° F. for a time sufficient to form a homogeneous sheet. The plasticizer, if one is employed, and other additives may be incorporated with the stabilizer. The stabilized composition may then be removed from the mill in the form of a sheet or film of the desired thickness which may be used as such or subjected to a polishing or embossing treatment.

The invention is further illustrated by the examples that follow. It is to be understood, however, that these examples are given solely for the purpose of illustration and that the invention is not to be regarded as being limited to any of the specific materials or conditions recited therein except as set forth in the appended claims.

EXAMPLE 1

To 100 parts by weight of a vinyl chloride homopolymer (Geon 103 EP) was added 20 parts by weight of di-2-ethylhexyl phthalate, 5 parts by weight of epoxidized soybean oil, and 3 parts by weight of one of the stabilizers of the present invention. The resulting mixture was blended at room temperature and then charged to a two-roll, steam-heated, differential speed mill whose surface temperature was maintained at 350° F. The mixture was milled for 5 minutes and then removed from the rolls as a sheet 0.045 inch in thickness.

The heat stability ratings of the compositions were determined by placing 1 x 1 inch speciments which had been cut from the milled sheets in a forced-circulation air oven at 350° F. and removing speciments periodically until degradation was complete as judged by color change. The stabilizers used and the heat-stability ratings of the stabilized compositions are given in Table I. A numerical scale is used to indicate the color of the samples, with a rating of 0 denoting absence of color, 1 denoting light yellow, 2 denoting yellow, 3 denoting dark yellow, 4 denoting light tan, 5 denoting tan, 6 denoting brown, and 7 denoting black.

The clarity of cast films of these compositions is also indicated in this table.

TABLE I

| Stabilizer (percent by weight) | Color After Indicated Number of Minutes at 350° F. | | | | | | | | | | Clarity of Cast Film |
|---|---|---|---|---|---|---|---|---|---|---|---|
| | 15 | 30 | 45 | 60 | 75 | 90 | 105 | 120 | 135 | 150 | |
| Stabilizer A | 1 | 1 | 1 | 1 | 2 | 2 | 4 | 4 | 5 | 5 | Clear. |
| 37.5% Barium myristate | | | | | | | | | | | |
| 19.9% Cadmium benzoate | | | | | | | | | | | |
| 25.1% Zinc stearate | | | | | | | | | | | |
| 9.0% Pentaerythritol powder | | | | | | | | | | | |
| 8.5% 2,2-bis (4-hydroxyphenyl) propane | | | | | | | | | | | |
| Stabilizer B | 1 | 1 | 1 | 2 | 4 | 4 | 4 | 5 | 5 | 6 | Do. |
| 37.5% Barium myristate | | | | | | | | | | | |
| 19.9 Cadumim benzoate | | | | | | | | | | | |
| 13.4% Zinc benzoate | | | | | | | | | | | |
| 14.6% Pentaerythritol powder | | | | | | | | | | | |
| 14.6% 2,2-bis 4-hydroxyphenyl) propane | | | | | | | | | | | |
| Comparative Stabilizer | 1 | 2 | 2 | 4 | 4 | 5 | 5 | 6 | 6 | 6 | Cloudy. |
| 35% Barium laurate | | | | | | | | | | | |
| 49% Cadmium laurate | | | | | | | | | | | |
| 8% Pentaerythritol powder | | | | | | | | | | | |
| 8% p-Tert. octylpheno | | | | | | | | | | | |

From the data in Table I it will be seen that the compositions that contained the stabilizers of the present invention were superior in heat stability and clarity to the composition that contained the comparative stabilizer.

EXAMPLE 2

To 100 parts by weight of a vinyl chloride homopolymer (VC-100) were added 34 parts by weight of di-2-ethylhexyl phthalate, 8 parts by weight of isooctyl epoxytallate, 0.2 part by weight of stearic acid, 1 part by weight of monodecyl diphenyl phosphite, and 0.5 part by weight of one of the stabilizers of this invention. The resulting mixture was blended at room temperature and then charged to a two-roll, steam-heated, differential speed mill whose surface temperature was maintained at 330° F. The mixture was milled for 5 minutes and then removed from the rolls as a sheet 0.020 inch in thickness. The heat stability ratings of the compositions are given in Table II.

TABLE II

| | Color After Indicated Number of Minutes at 375° F. | | | | | | |
|---|---|---|---|---|---|---|---|
| | 0 | 10 | 20 | 30 | 40 | 50 | 60 |
| Stabilizer: | | | | | | | |
| A | 0 | 0 | 0 | 1 | 2 | 5 | 7 |
| B | 0 | 0 | 0 | 1 | 2 | 6 | 7 |
| Comparative Stabilizer | 0 | 0 | 1 | 3 | 5 | 7 | 7 |

EXAMPLE 3

To 100 parts by weight of a vinyl chloride homopolymer (VC-100) were added 34 parts by weight of di-2-ethylhexyl phthalate, 8 parts by weight of isooctyl epoxytallate, 0.2 part by weight of stearic acid, 1.5 part by weight of a liquid stabilizer containing barium nonylphenolate, cadmium 2-ethylhexoate, zinc 2-ethylhexoate, and monodecyl diphenyl phosphite, and 0.5 part by weight of one of the present stabilizers. The resulting mixture was blended at room temperature and then charged to a two-roll, steam-heated, differential speed mill whose surface temperature was maintained at 330° F. The mixture was milled for 5 minutes and then removed from the rolls as a sheet 0.020 inch in thickness. The heat stability ratings of the compositions are given in Table III.

TABLE III

| | Color After Indicated Number of Minutes at 375° F. | | | | | | | | | | |
|---|---|---|---|---|---|---|---|---|---|---|---|
| | 0 | 10 | 20 | 30 | 40 | 50 | 60 | 70 | 80 | 90 | 100 |
| Stabilizer: | | | | | | | | | | | |
| A | 0 | 0 | 0 | 0 | 1 | 2 | 3 | 3 | 4 | 5 | 7 |
| B | 0 | 0 | 0 | 1 | 2 | 3 | 4 | 5 | 5 | 5 | 7 |
| Comparative Stabilizer | 0 | 0 | 0 | 1 | 2 | 3 | 4 | 5 | 5 | 6 | 7 |

What is claimed is:

1. A stabilizer for vinyl halide resin compositions which comprises (a) a mixture of barium, cadmium, and zinc salts that contains at least one salt having an aromatic anion and at least one salt having an aliphatic anion; (b) a phenolic compound; and (c) a polyhydric alcohol selected from the group consisting of pentaerythritol, sorbitol, mannitol, methyl glucoside, compounds having the formula

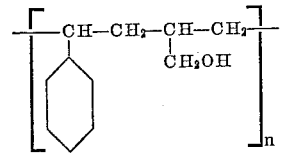

wherein $n$ represents a number in the range of 5 to 10, and mixtures thereof in the amounts of approximately 10 parts to 30 parts by weight of said cadmium salt, 25 parts to 45 parts by weight of said barium salt, 5 parts to 30 parts by weight of said zinc salt, 5 parts to 20 parts by weight of said phenolic compound, and 5 parts to 20 parts by weight of said polyhydric alcohol.

2. A stabilizer for vinyl halide resin compositions in accordance with claim 1 wherein the zinc salt is zinc benzoate.

3. A stabilizer for vinyl halide resin compositions in accordance with claim 1 wherein the zinc salt is a zinc salt of fatty acids having from 6 to 18 carbon atoms.

4. A stabilizer for vinyl halide resin compositions which comprises (a) approximately 10 parts to 30 parts by weight of cadmium benzoate; (b) approximately 25 parts to 45 parts by weight of a barium salt of fatty acids having from 6 to 18 carbon atoms; (c) approximately 5 parts to 30 parts by weight of a zinc salt selected from the group consisting of zinc salts of benzoic acid, alkylbenzoic acids, halobenzoic acids, alkylene bis phenols, and fatty acids having from 6 to 18 carbon atoms; (d) approximately 5 parts to 20 parts by weight of a phenolic compound; and (e) approximately 5 parts to 20 parts by weight of a polyhydric alcohol selected from the group consisting of pentaerythritol, sorbitol, mannitol, methyl glucoside, the compounds having the formula

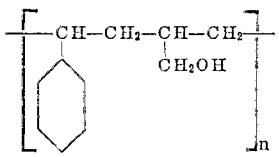

wherein $n$ represents a number in the range of 5 to 10, and mixtures thereof.

5. A stabilizer for vinyl halide resin compositions which comprises (a) approximately 10 parts to 30 parts by weight of cadmium benzoate; (b) approximately 25 parts to 45 parts by weight of barium myristate; (c) approximately 5 parts to 30 parts by weight of zinc benzoate; (d) approximately 5 parts to 20 parts by weight of a phenolic compound; and (e) approximately 5 parts to 20 parts by weight of a polyhydric alcohol selected from the group consisting of pentaerythritol, sorbitol, mannitol, methyl glucoside, compounds having the formula

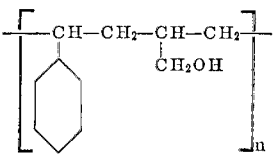

wherein $n$ represents a number in the range of 5 to 10, and mixtures thereof.

6. A stabilizer for vinyl halide resins in accordance with claim 5 wherein the phenolic compound is 2,2-bis(4-hydroxyphenyl) propane.

7. A stabilizer for vinyl halide resins in accordance with claim 5 wherein the polyhydric alcohol is pentaerythritol.

8. A stabilizer for vinyl halide resins in accordance with claim 5 wherein the polyhydric alcohol is sorbitol.

9. A stabilizer for vinyl halide resin compositions which comprises (a) approximately 10 parts to 30 parts by weight of cadmium benzoate; (b) approximately 25 parts to 45 parts by weight of barium myristate; (c) approximately 5 parts to 30 parts by weight of a zinc salt of fatty acids having from 6 to 18 carbon atoms; (d) approximately 5 parts to 20 parts by weight of a phenolic compound; and (e) approximately 5 parts to 20 parts by weight of a polyhydric alcohol selected from the group consisting of pentaerythritol, sorbitol, mannitol, methyl glucoside, compounds having the formula

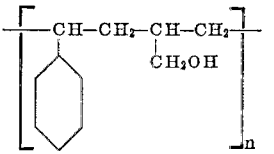

wherein $n$ represents a number in the range of 5 to 10, and mixtures thereof.

10. A stabilizer for vinyl halide resin compositions in accordance with claim 9 wherein the zinc salt is zinc stearate.

11. A stabilizer for vinyl halide resin compositions in accordance with claim 9 wherein the phenolic compound is 2,2-bis (4-hydroxyphenyl) propane.

12. A stabilizer for vinyl halide resin compositions in accordance with claim 9 wherein the polyhydric alcohol is pentaerythritol.

13. A heat and light stable resinous composition comprising a vinyl halide resin and a heat stabilizing amount of a stabilizer comprising (a) a mixture of barium, cadmium, and zinc salts that contains at least one salt having an aromatic anion and at least one salt having an aliphatic anion; (b) a phenolic compound; and (c) a polyhydric alcohol selected from the group consisting of pentaerythritol, sorbitol, mannitol, methyl glucoside, and compounds having the formula

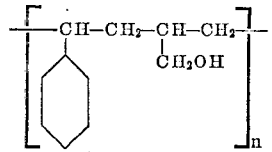

wherein $n$ represents a number in the range of 5 to 10, and mixtures thereof in the amounts of approximately 10 parts to 30 parts by weight of said cadmium salt, 25 parts to 45 parts by weight of said barium salt, 5 parts to 30 parts by weight of said zinc salt, 5 parts to 20 parts by weight of said phenolic compound, and 5 parts to 20 parts by weight of said polyhydric alcohol.

14. A heat and light stable resinous composition comprising polyvinyl chloride and approximately 0.1 part to 10 parts by weight per 100 parts by weight of said polyvinyl chloride of a stabilizer comprising (a) approximately 10 parts to 30 parts by weight of cadmium benzoate; (b) approximately 25 parts to 45 parts by weight of a barium salt of fatty acids having from 6 to 18 carbon atoms; (c) approximately 5 parts to 30 parts by weight of a zinc salt selected from the group consisting of zinc salts of benzoic acid, alkylbenzoic acids, halobenzoic acids, alkylene bis phenols, and fatty acids having from 6 to 18 carbon atoms; (d) approximately 5 parts to 20 parts by weight of a phenolic compound; and (e) approximately 5 parts to 20 parts by weight of a polyhydric alcohol selected from the group consisting of pentaerythritol, sorbitol, mannitol, methyl glucoside, compounds having the formula

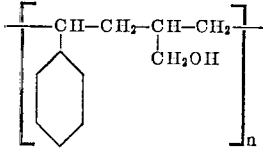

wherein $n$ represents a number in the range of 5 to 10, and mixtures thereof.

15. A heat and light stable resinous composition comprising polyvinyl chloride and approximately 0.3 part to 5 parts by weight per 100 parts by weight of said polyvinyl chloride of a stabilizer comprising (a) approximately 10 parts to 30 parts by weight of cadmium benzoate; (b) approximately 25 parts to 45 parts by weight of barium myristate; (c) approximately 5 parts to 30 parts by weight of zinc benzoate; (d) apprxoimately 5 parts to 20 parts by weight of a phenolic compound; and (e) approximately 5 parts to 20 parts by weight of a polyhydric alcohol selected from the group consisting of pentaerythritol, sorbitol, mannitol, methyl glucoside, compounds having the formula

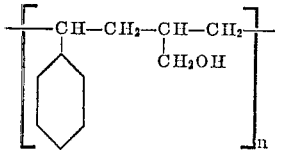

wherein $n$ represents a number in the range of 5 to 10, and mixtures thereof.

16. A heat and light stable resinous composition in accordance with claim 15 wherein the phenolic compound is 2,2-bis (4-hydroxyphenyl) propane.

17. A heat and light stable resinous composition in accordance with claim 15 wherein the polyhydric alcohol is pentaerythritol.

18. A heat and light stable resinous composition comprising polyvinyl chloride and approximately 0.3 part to 5 parts by weight per 100 parts by weight of said polyvinyl chloride of a stabilizer comprising (a) approximately 10 parts to 30 parts by weight of cadmium benzoate; (b) approximately 25 parts to 45 parts by weight of barium myristate; (c) approximately 5 parts to 30 parts by weight of a zinc salt of fatty acids having from 6 to 18 carbon atoms; (d) approximately 5 parts to 20 parts by weight of a phenolic compound; and (e) approximately 5 parts to 20 parts by weight of a polyhydric alcohol selected from the group consisting of pentaerythritol, sorbitol, mannitol, methyl glucoside, compounds having the formula

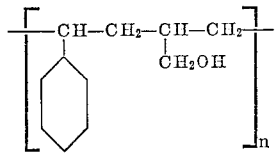

wherein $n$ represents a number in the range of 5 to 10, and mixtures thereof.

19. A heat and light stable resinous composition in accordance with claim 18 wherein the zinc salt is zinc stearate and the phenolic compound is 2,2-bis (4-hydroxyphenyl) propane.

20. A heat and light stable resinous composition in accordance with claim 18 wherein the zinc salt is zinc stearate and the polyhydric alcohol is pentaerythritol.

References Cited

UNITED STATES PATENTS

| | | | |
|---|---|---|---|
| 2,564,646 | 8/1951 | Leistner et al. | 260—23 X |
| 2,625,521 | 1/1953 | Fischer et al. | 260—23 X |
| 2,711,401 | 6/1955 | Lally | 260—45.75 |
| 2,837,490 | 6/1958 | Hecker | 260—23 X |
| 2,935,491 | 5/1960 | Mack | 260—45.75 |
| 2,997,454 | 8/1961 | Leistner et al. | 260—23 X |
| 3,075,940 | 1/1963 | Pazinski et al. | 260—45.75 |
| 3,144,422 | 8/1964 | Homberg | 260—23 X |
| 2,590,059 | 3/1952 | Winkler | 260—23 X |

OTHER REFERENCES

Modern Plastics Encylcopedia, vol. 34, No. 1A (1956).

DONALD E. CZAJA, *Primary Examiner.*

LEON J. BERCOVITZ, *Examiner.*

R. A. WHITE, *Assistant Examiner.*